(12) United States Patent
Parks

(10) Patent No.: US 10,735,507 B2
(45) Date of Patent: Aug. 4, 2020

(54) EXTENDED PEER-TO-PEER CHANNEL LIST

(71) Applicant: DisplayLink (UK) Limited, Cambridge (GB)

(72) Inventor: Matthew Parks, Cambridge (GB)

(73) Assignee: DISPLAYLINK (UK) LIMITED, Cambridge (GB)

(*) Notice: Subject to any disclaimer, the term of this patent is extended or adjusted under 35 U.S.C. 154(b) by 84 days.

(21) Appl. No.: 15/786,532

(22) Filed: Oct. 17, 2017

(65) Prior Publication Data
US 2018/0109609 A1    Apr. 19, 2018

(30) Foreign Application Priority Data

Oct. 18, 2016 (GB) .................................. 1617633.1

(51) Int. Cl.
*G06F 15/16* (2006.01)
*H04L 29/08* (2006.01)
*H04W 76/14* (2018.01)

(52) U.S. Cl.
CPC ...... *H04L 67/1076* (2013.01); *H04L 67/1051* (2013.01); *H04L 67/1085* (2013.01); *H04L 67/1091* (2013.01); *H04W 76/14* (2018.02)

(58) Field of Classification Search
CPC ............. H04L 67/1076; H04L 67/1051; H04L 67/1085; H04L 67/1091; H04W 67/14; H04W 76/14

(Continued)

(56) References Cited

U.S. PATENT DOCUMENTS 8,666,394 B1 *  3/2014  Montemurro ......... H04W 76/14
                                                        455/426.1
2010/0128695 A1  5/2010  Nagaraja
(Continued)

FOREIGN PATENT DOCUMENTS

EP          2632117 A2      8/2013
EP          2632117 A3      10/2013
WO      2016139859 A1      9/2016

OTHER PUBLICATIONS

European Search Report, Application No. GB1617633.1, dated Mar. 20, 2017, 3 pages.
(Continued)

*Primary Examiner* — Sm A Rahman
(74) *Attorney, Agent, or Firm* — Haynes and Boone, LLP

(57) ABSTRACT

A method of facilitating peer-to-peer connection involves transmitting, by a first peer device, an identification of the first peer device and information regarding its capabilities. The information regarding its capabilities including a list of transmission channels that the first peer device is capable of supporting, an indication of which transmission channels the first peer device is capable of supporting as a group owner, and/or an indication of which transmission channels the first peer device is capable of supporting as a client. The first peer device receives from a second peer device, an identification of the second peer device and information regarding its capabilities including a list of transmission channels that the second peer device is capable of supporting. The first peer device and the second peer device then negotiate which of the first and second peer devices should be the group owner and which should be the client.

18 Claims, 6 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2012/0278389 A1* | 11/2012 | Thangadorai | H04W 84/20 709/204 |
| 2013/0329600 A1 | 12/2013 | Vedula et al. | |
| 2014/0185495 A1 | 7/2014 | Kuchibhotla et al. | |
| 2015/0264123 A1* | 9/2015 | Smadi | H04W 4/12 709/206 |
| 2016/0014837 A1 | 1/2016 | Seo et al. | |
| 2016/0127950 A1 | 5/2016 | Gupta et al. | |
| 2016/0165653 A1* | 6/2016 | Liu | H04L 67/104 370/329 |
| 2016/0373914 A1* | 12/2016 | Lee | H04W 8/005 |
| 2018/0007633 A1 | 1/2018 | Mori et al. | |

OTHER PUBLICATIONS

European Search Report issued on corresponding application dated Feb. 20, 2018 for EP 17 19 6039.

* cited by examiner

EXTENDED PEER-TO-PEER CHANNEL LIST

RELATED APPLICATIONS

This application claims priority to Great Britain Patent Application No. 1617633.1 entitled "Extended Peer-to-Peer Channel List," which was filed Oct. 18, 2016, which is hereby incorporated by reference in its entirety.

BACKGROUND

It is possible to connect two devices in a network such that, rather than one device acting as a server or host and the other as a client, the two devices have equal and flexible standing. This is known as a peer-to-peer network.

Although the devices are treated as peers in the formation of the network, the channel and other attributes are conventionally determined by one of the devices, known as a group owner. This is commonly a computing device such as a laptop. The other device, which may for example be a docking station, is known as the client.

In the current art, a first device transmits a list of channels that it supports as a group owner to another device when seeking to connect with another device. The second device's behaviour changes depending on whether it is the group owner or the client: if it is determined that it is the group owner, it must select a channel for the connection that is supported by both devices as group owner, whereas if it is determined that it is the client it transmits a list of channels it supports back to the first device, which is then able to select from among them. This means that the behaviour of the system changes depending on whether the first device is determined to be the group owner or the client, which is in itself undesirable, and also effectively rules out many available channels with most combinations of peers. An example of peer-to-peer group owner determination may be found in WO 2011/041735.

Furthermore, although Dynamic Frequency Selection (DFS) channels are available, they have stringent monitoring and use requirements, which many devices are incapable of providing as group owner, even though they can communicate over these channels as a client. As well as limiting the channels available, this means that the 5 GHz wireless band cannot be used efficiently. At present only one 80 MHz channel is available in the UK and two in the US unless the DFS channels can be used.

The invention aims to solve or at least mitigate these problems.

SUMMARY OF THE INVENTION

Thus, according to a first aspect, the invention provides a method for facilitating peer-to-peer connection, the method comprising:
  transmitting, by a first peer device, an identification of the first peer device and information regarding its capabilities, wherein the information regarding its capabilities includes a list of transmission channels that the first peer device is capable of supporting, the list including at least one of:
    an indication of which transmission channels the first peer device is capable of supporting as a group owner, and
    an indication of which transmission channels the first peer device is capable of supporting as a client.

In a preferred embodiment, the method further comprises:
  receiving, by the first peer device from a second peer device, an identification of the second peer device and information regarding its capabilities, wherein the information regarding its capabilities includes a list of transmission channels that the second peer device is capable of supporting, the list including at least one of:
    an indication of which transmission channels the second peer device is capable of supporting as a group owner, and
    an indication of which transmission channels the second peer device is capable of supporting as a client.

Preferably, the first peer device may first transmit the list including the indication of which transmission channels the first peer device is capable of supporting as a group owner and then transmit the list including the indication of which transmission channels the first peer device is capable of supporting as a client after it has received the list from the second peer including the indication of which transmission channels the second peer device is capable of supporting as a group owner.

Alternatively, the first peer device may first transmit the list including the indication of which transmission channels the first peer device is capable of supporting as a group owner and receive the list from the second peer including the indication of which transmission channels the second peer device is capable of supporting as a group owner, the first peer device may then determine which channels it is capable of supporting as a client that match channels that the second peer is capable of supporting as a group owner and may then transmit the list including the indication of which transmission channels the first peer device is capable of supporting as a client that only includes the matching channels.

In an embodiment, the method further comprises:
  communicating, by the first peer device with the second peer device, to negotiate which of the first and second peer devices should be the group owner and which should be the client;
  if the first peer device is determined to be the group owner, selecting, by the first peer device a transmission channel that the first peer device is capable of supporting as a group owner and that the second peer device is capable of supporting as a client based on the received list of transmission channels that the second peer device is capable of supporting as a client; and
  forming the peer-to-peer network over the selected channel.

Preferably, communicating, by the first peer device with the second peer device, to negotiate which of the first and second peer devices should be the group owner and which should be the client may comprise:
  transmitting, by the first peer device, in the information regarding the capabilities of the first peer device, a value of the intent of the first peer device to be a group owner;
  receiving, by the first peer device from the second peer device, in the information regarding the capabilities of the second peer device, a value of the intent of the second peer device to be a group owner; and
  determining that the peer device whose value of intent to be a group owner is higher is the group owner and that the peer device whose value of intent to be a group owner is lower is the client.

In an embodiment, the method may further comprise adjusting, by the first peer device, the value of the intent of the first peer device to be a group owner based on enabled capabilities of the first peer device.

The value of the intent of the first peer device to be a group owner may preferably be increased when the first peer device is connected to the internet and is capable of allowing access to the internet to connected peer devices.

In a preferred embodiment, the list received from the second peer device includes a list of transmission channels the second peer device is capable of supporting as a group owner, and a list of transmission channels the second peer device is capable of supporting as a client.

In an alternative preferred embodiment, the list received from the second peer device includes a list of transmission channels the second peer device is capable of supporting as a client, together with an indication of which of the transmission channels the second peer device is also capable of supporting as a group owner.

In a preferred embodiment, the list transmitted by the first peer device includes a list of transmission channels the first peer device is capable of supporting as a group owner, and a list of transmission channels the first peer device is capable of supporting as a client.

In an alternative preferred embodiment, the list transmitted by the first peer device includes a list of transmission channels the first peer device is capable of supporting as a client, together with an indication of which of the transmission channels the first peer device is also capable of supporting as a group owner.

Preferably, the transmission channels that the first peer device is capable of supporting as a client includes the transmission channels the first peer device is capable of supporting as a group owner.

Preferably, the transmission channels that the second peer device is capable of supporting as a client includes transmission channels that the second peer device is not capable of supporting as a group owner.

The transmission channels that the second peer device is capable of supporting as a client but not as a group owner may comprise Dynamic Frequency Selection, DFS, transmission channels.

According to a second aspect, the invention provides a first peer device configured to perform the steps of a method as described above.

According to a third aspect, the invention provides a system comprising a first peer device according to the second aspect and a second peer device in communication with the first peer device.

Another aspect of the invention provides a method for connecting two peers in a peer-to-peer connection using a channel only conventionally supported by one peer. The method may comprise:

1. The peers exchanging lists of channels they support as group owners;
2. The peers exchanging lists of channels they support as clients;
3. The peers selecting a group owner;
4. The peers selecting a channel over which a connection is possible;
5. The peers connecting and forming a group.

This is beneficial as it will allow a greater variety of channels to be used to form peer-to-peer connections, thus reducing congestion where multiple peer-to-peer networks are operating in close proximity to one another. This will improve the performance of the various peer-to-peer networks.

Preferably, the method selects among conventional channels and also Dynamic Frequency Selection (DFS) channels. This will allow further range and variation in the channels available and result in more efficient use of the 5 GHz band.

A still further aspect of the invention provides a method for determining a preferred group owner included as part of the previous methods. The method comprises:

1. A peer determining whether it has a specified desirable feature;
2. If so, the peer transmitting an indication that it should be the group owner;
3. If not, the peer transmitting an indication that it should not be the group owner;
4. The peer that has the desired feature becoming group owner.

Preferably, the desired feature is a network connection, for example over an Ethernet cable. The determination would therefore be of the presence or absence of such a feature.

However, it may be any other device capability such as an improved network card, or a larger number of supported channels. Accordingly, since the feature may not consist of the binary presence or absence of a feature, the determination of whether a peer has a specified desirable feature could comprise determining the magnitude of a variable feature across a range, for example determining that a peer has access to a network connection of one of five available bandwidths, and the indication of whether the peer should be group owner may be varied across a range accordingly, for example from one to five rather than a binary yes or no.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
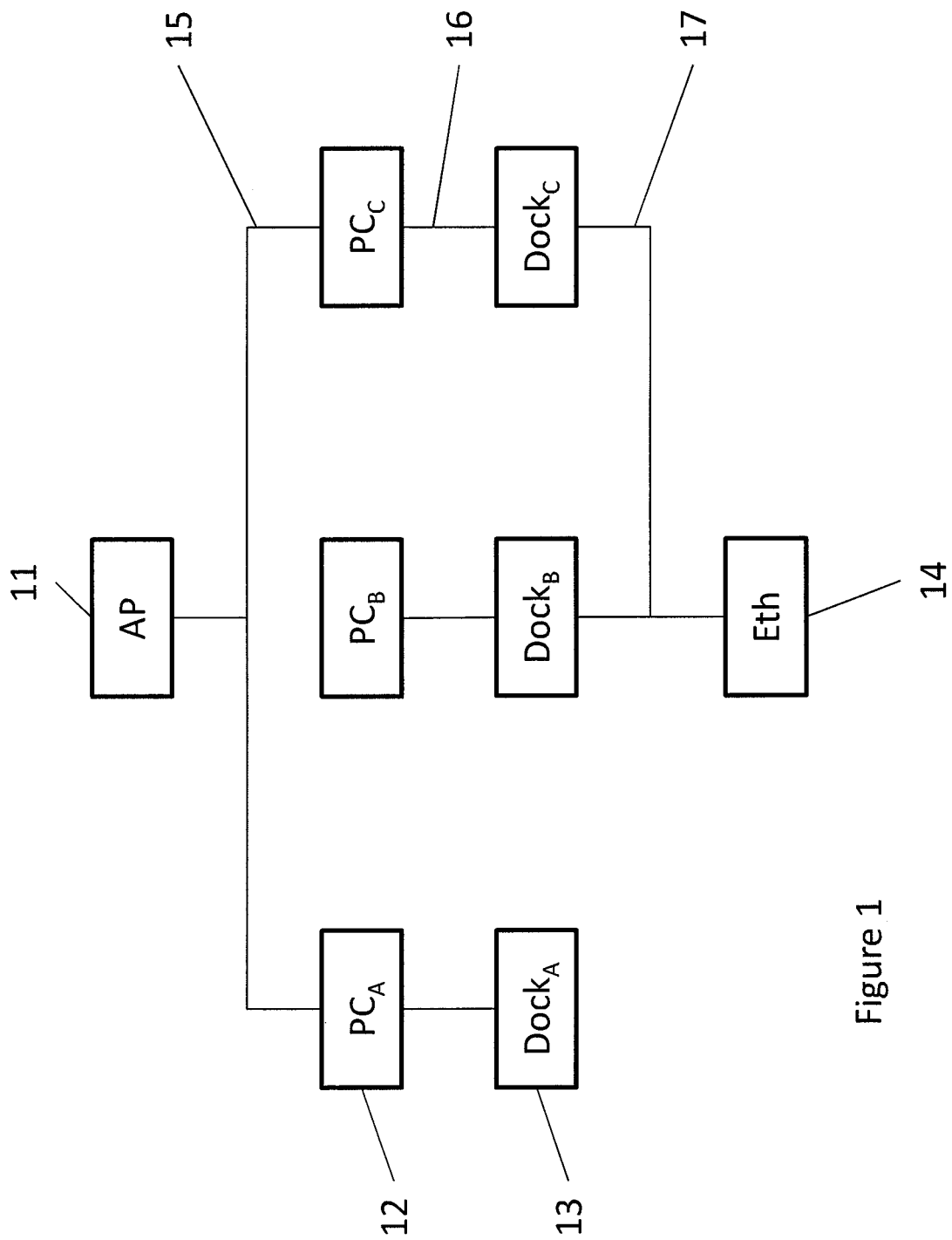
FIG. 1 shows an example network.

FIG. 1 shows an example corporate network comprising a wireless access point 11, three computers 12, three docking stations 13, and a wired Ethernet interface 14. Of the three computers 12, the first 12A and third 12C computers are not only connected via connections 16A and 16C to their respective docking stations 13A and 13C but also connected via connections 15A and 15C to the access point 11, whereas the second computer 12B is connected via a connection 16B to its respective docking station 13B only. The three docking stations 13 are all connected via connections 16 to their respective computers 12, and the second 13B and third 13C docking stations are also connected via connections 17 to the Ethernet interface 14. This network will be used in the following examples.

All the computers 12 and docking stations 13 are considered peers and the connections 16 between them are peer-to-peer networks in which there is no pre-determined host or client. This is demonstrated in FIG. 2, which shows two of the devices 21 and 22 and the connection 23 between them. For this purpose, it is not important which is the computer 12 and which is the docking station 13 as they are interchangeable during the formation of the connection 23.

Figure 2:
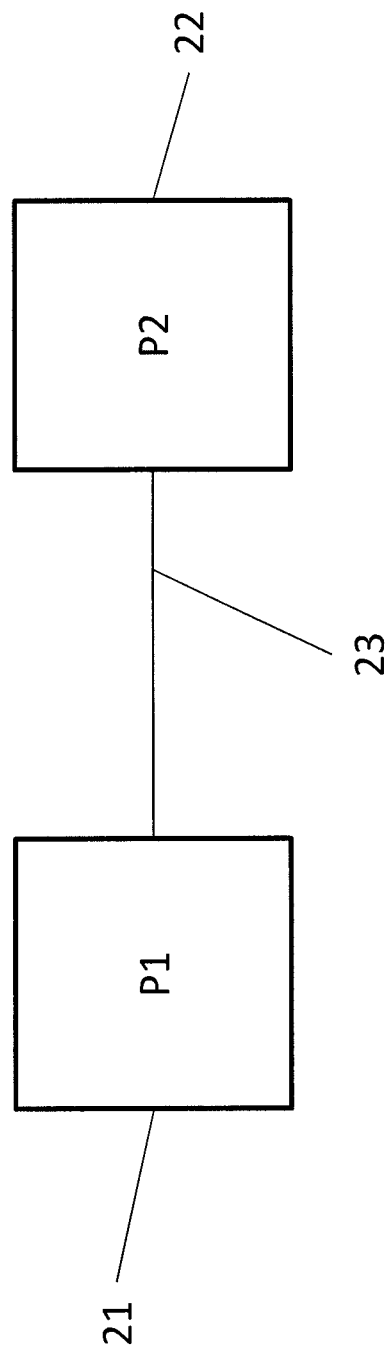
FIG. 2 shows a connection between two peers.
Figure 3A:
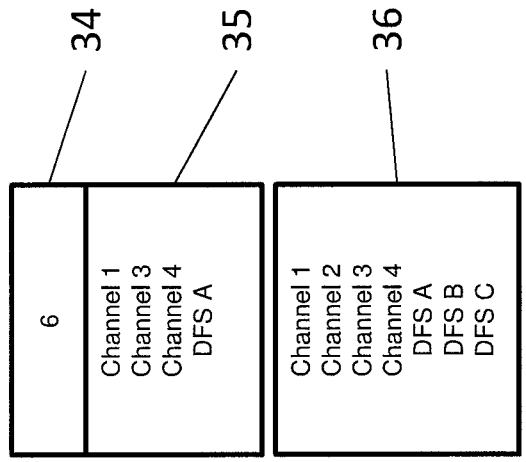
FIGS. 3a and 3b show examples of the information exchanged during connection.
Figure 3A:
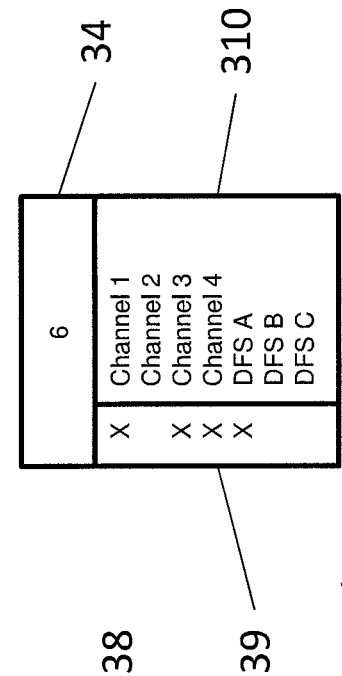

FIG. 3a shows examples of the information elements exchanged by the peers 21 and 22 during connection according to a first embodiment of the invention. For the purposes of this description, the peers shown in FIG. 2 will be used.

The left-hand block shows the information elements supplied by Peer 1 21. It includes a group owner intent 31, a list of channels supported by Peer 1 as a group owner 32, and a list of channels supported by Peer 1 as a client 33. In this embodiment, the group owner intent 31 and 34 is an integer between 1 and 10 indicating the "enthusiasm" with which that peer want to be the group owner. A larger value of the integer indicates that the peer is more capable of being the group owner and a lower value of the integer indicates that the peer has less capability of being the group owner. A comparison of the two values therefore provides a decision of which peer should be the group owner, where the peer that supplies the larger group owner intent becomes the group owner when the connection 23 is formed. The group owner intent 31 for Peer 1 is '3', indicating that it should not become group owner, though it is capable of doing so as it would be possible for Peer 2 to supply a lower group owner intent 34. If both peers provide the same integer value, there are several known ways to resolve the deadlock, which will not be further described here.

The list of channels supported by Peer 1 as group owner 32 contains three conventional channels: Channel 1, Channel 2, and Channel 3. Because the group owner has a different role with regard to the connection 23, one of these channels must be used if Peer 1 21 is group owner. The number of channels supported as group owner could be a factor used in the determination of the number to be transmitted as the group owner intent 31, 34.

The list of channels supported by Peer 1 as client 33 contains the aforementioned three conventional channels, plus a Dynamic Frequency Selection (DFS) channel: DFS A. The list of channels supported as client 33 may be more extensive than the list of channels supported as group owner 32, as here, because the client will not be responsible for controlling the connection 23. However, also as shown here, the list of channels supported as group owner 32 will commonly be a subset of the channels supported as client 33 as these are all the channels to which Peer 1 21 can connect at all.

A similar set of information elements are supplied by Peer 2 22. Here also there is a group owner intent 34, which in the case of Peer 2 22 is '6'. This indicates that Peer 2 22 would be more suitable as a group owner, though not perfect as Peer 1 21 would be able to supply a higher group owner intent 31, and given that it is in fact higher than the group owner intent 31 supplied by Peer 1 21, in this example connection 23 Peer 2 22 would become the group owner.

As previously described for Peer 1 21, Peer 2 22 has supplied a list of the channels it supports as a group owner 35: Channel 1, Channel 3, Channel 4, and DFS A. This is a different list to the list 32 supplied by Peer 1 21 as Peer 2 22 is a different device with different requirements and capabilities. Similarly, Peer 2 22 also supplies a list of the channels it supports as a client 36: Channel 1, Channel 2, Channel 3, Channel 4, DFS A, DFS B, and DFS C. Again, this is a different list to the list of channels supported as a group owner 35 and also a different list to the list of channels that Peer 1 21 supports as a group owner 33.

The process of forming a connection 23 involves selecting a group owner and then finding compatible channels such that the connection is on a channel that the group owner supports as a group owner and the client supports as a client. For example, using the information elements in FIG. 3 and bearing in mind that Peer 2 22 has supplied the higher group owner intent 34 and is therefore likely to be selected as the group owner, the channel selected must be a channel supported by Peer 2 22 as group owner (i.e. Channel 1, Channel 3, Channel 4, or DFS A) and by Peer 1 21 as client (i.e. Channel 1, Channel 2, Channel 3, or DFS A). The connection 23 could therefore be formed on Channel 1, Channel 3, or DFS A.

This is distinct from conventional systems, which might only use the lists of channels supported as group owner 32 and 35. The connection 23 could therefore only be on Channel 1 or Channel 3 even though the group owner (in this case Peer 2 22) supports more channels. This results in congestion on a few channels and under-use of other channels.

Figure 3B:
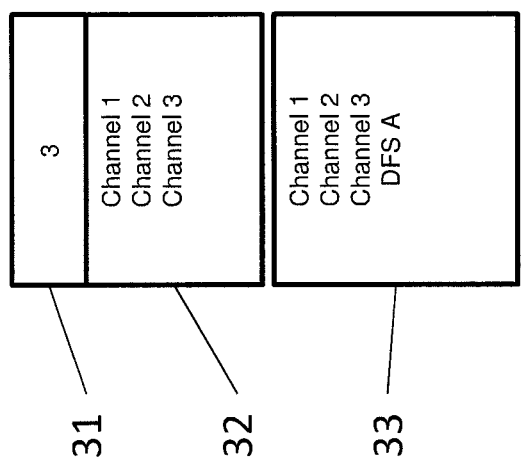
Figure 3B:
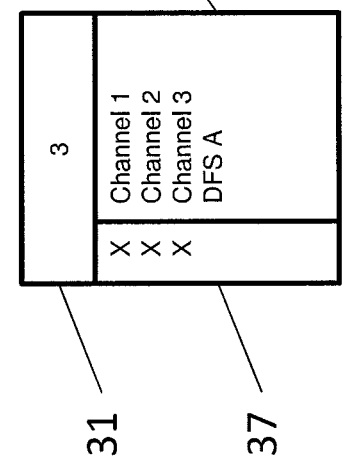

FIG. 3b shows a second embodiment with different example information elements exchanged by the peers 21 and 22 during the formation of the connection. The information contained in the information elements is the same as described in FIG. 3a, but it is communicated in a different format. Accordingly, the left-hand block shows the information provided by Peer 1 21 and the right-hand block shows the information provided by Peer 2 22.

In the embodiment shown in FIG. 3b, there is a separate Group Owner Intent 31 and 34 as previously described. However, there is only one channel list 38 and 39 in each information element. This is the complete list of channels supported by the device: in the case of Peer 1 21, the channels listed are Channel 1, Channel 2, Channel 3, and DFS A, which is the same as the list of channels supported by Peer 1 as a client 33. Likewise, the channels listed for Peer 2 22 are Channel 1, Channel 2, Channel 3, Channel 4, DFS A, DFS B, and DFS C: the channels it was previously described as supporting as a client 36 in FIG. 3a.

The final element in each information element is a flag list 37 and 39. This contains flags indicating the channels in the channel list which the device supports as a group owner, since this list is a subset of the complete list of channels supported. As in FIG. 3a, the channels supported by Peer 1 as a group owner are Channel 1, Channel 2, and Channel 3, and these channels are indicated by flags in the flag list 37. Likewise, the flag list 39 in Peer 2's information element contains flags indicating Channel 1, Channel 3, Channel 4, and DFS A: the same channels as previously described in FIG. 3a.

This embodiment has the benefit that only one list need be sent, as in the current art, but unlike the current art there are functionally two channel lists contained in the single list, as the system will be able to determine the channels supported as group owner and client and distinguish them from the channels only supported as client, which is currently impossible. It therefore functions in much the same way as the embodiment shown in FIG. 3a except that the lists cannot be sent separately.

If appropriate, a second flag list could be provided in order to indicate channels that are only supported as group owner and not as client. However, in most embodiments there will be no such channels and since it will operate in a similar way to the embodiment shown in FIG. 3b this alternative will not be further described.

Figure 4:
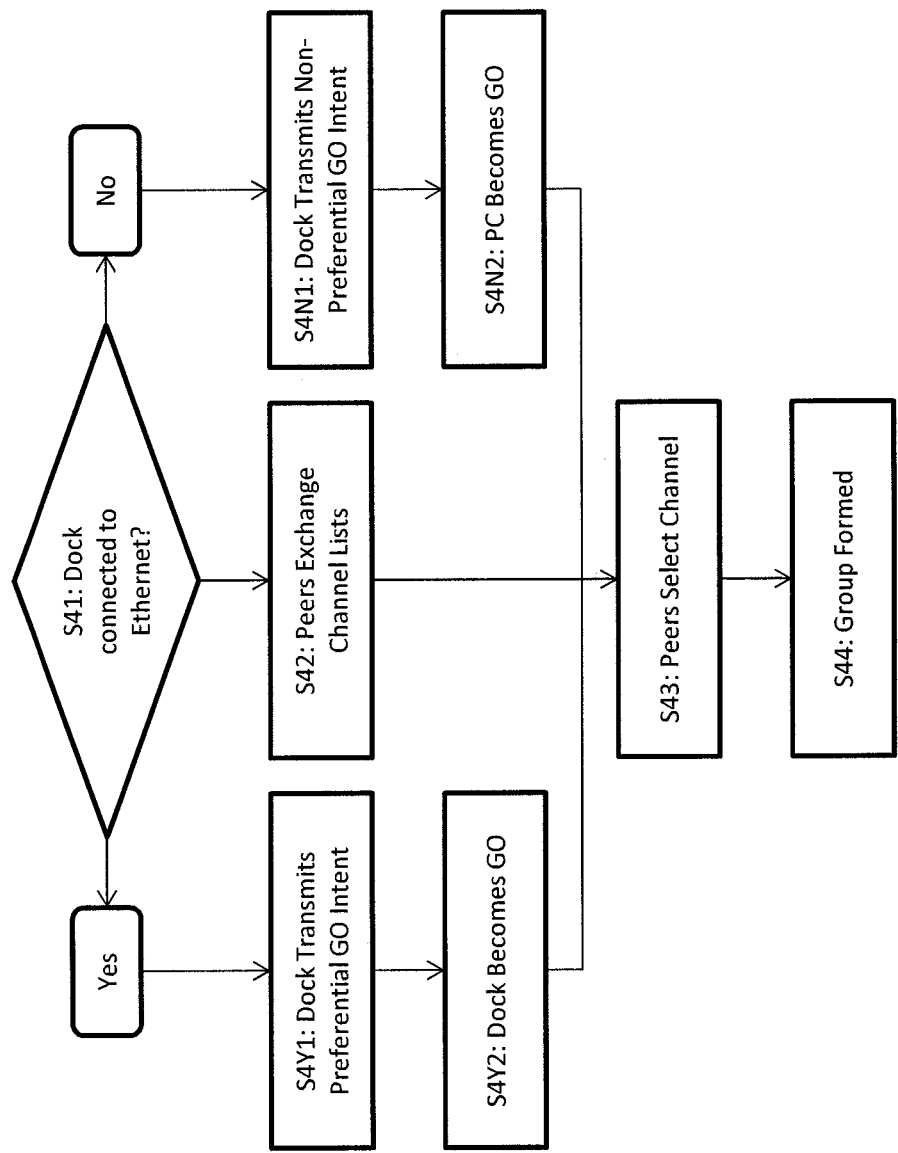
FIG. 4 shows a flowchart of the process.

FIG. 4 shows a flowchart of an example process in which the initiation of the connection is symmetrical. This process will be iterated once for each of the different pairs of computer 12 and docking station 13 shown in FIG. 1, with reference to FIGS. 2 and 3a. This is an example only and different mechanisms for determining group ownership and selecting a channel for connection could be used. Moreover, sets of steps may occur simultaneously, as shown here, or consecutively, in either order.

For the first pair 12A and 13A, the computer 12A is connected to the corporate wireless access point 11 and the docking station 13A is not connected to the wired Ethernet network connection 14. In this embodiment, group owner intent is determined by whether or not the docking station 13A is connected to Ethernet 14 and the computer to the wireless access point 11. If the docking station 13A is connected to Ethernet 14, it will be beneficial for it to be group owner as this means that it will be responsible for the network connection, which is likely to be faster and more reliable if it is via a connected Ethernet cable.

The connection is determined at Step S41, and since in this pair the docking station 13A is not connected to Ethernet 14, the process follows the branch on the right of the diagram, beginning at "No" and labelled 'N' in the step numbering.

At Step S4N1, the docking station 13A transmits its group owner (GO) intent. In the system as described with reference to FIG. 3, this will be an integer between 1 and 10, and will be a low number to indicate that the docking station 13A should not be group owner. This is because it is likely to be desirable for the computer 12A to be group owner as it has an established connection to the access point 11. In the example shown in FIGS. 2 and 3, the docking station 13A might therefore be represented by Peer 1 21.

Since the computer 12A already has a connection to the access point 11, it might transmit a high group owner intent, or it might always transmit the same mid-level group owner intent as its desirability as a group owner is dependent on the docking station 13A. In either case, in this example the computer 13A transmits a higher group owner intent than the docking station 13A and is represented by Peer 2 22 in FIGS. 2 and 3. It therefore becomes group owner and is responsible for the connection 16 and 23.

Simultaneously with this part of the process, the peers 21 and 22 exchange channel lists at Step S42. This is done regardless of whether the docking station 13A is connected to the Ethernet 14 and therefore follows on directly from Step S41 regardless of this determination. The channel lists may be in any one of a number of forms. For example, they may be complete information elements such as those shown in FIG. 3a, comprising separate lists of the channels supported as group owner 32 and 35 and channels supported as client 33 and 36. Alternatively, they may be like the lists shown in FIG. 3b, including all the channels supported by the devices 38 and 310 with those which are supported as group owner marked with flags 37 and 39.

Alternatively, the lists may be transmitted separately, such that the devices first transmit the lists of channels they each support as group owner 32 and 35 and then, having received these, transmit the lists of channels they support as clients 33 and 36. Finally, a peer 21 and 22 may inspect the list of channels the other peer supports as group owner 35 and 32 and transmit only the channels it supports as client which correspond with items on that list.

At Step S43, the computer 12A has been determined as group owner, as described in Steps S4N1 and S4N2 and the branches of the process re-combine. The peers 21 and 22 then select the channel to be used.

This comprises first comparing the list of channels supported by the group owner as group owner (in this example, Channel 1, Channel 3, Channel 4, and DFS A) 35 with the list of channels supported by the client as client (Channel 1, Channel 2, Channel 3, and DFS A) 33 in order to determine which channels are compatible and could be used. In this case, Channel 1, Channel 3, and DFS A are compatible.

Next, the channel to be used must be determined through the use of heuristics. In this case, an example heuristic would be to automatically use the channel in use for the connection 15A between the computer 12A and the access point 11; it is especially desirable to use this channel as otherwise there may be performance loss as the computer 12A attempts to handle connections 15A, 16A on two different channels. This could therefore override all other possible heuristics described hereinafter. For example, if the computer 12A were connected to the access point 11 on Channel 1, Channel 1 would automatically be used for the connection 16A between the computer 12A and the docking station 13A.

Alternatively, the computer 12A could disconnect and reconnect to the access point 11 on a different channel if the channel it is using for that connection 15A is not supported by the docking station 13A as a client. Continuing the same example, if the computer 12A were connected to the access point 11 on Channel 4, it would not be possible for it to connect to the docking station 13A on this channel. It might therefore disconnect and reconnect on, for example, Channel 3.

Naturally, this alternative would be dependent on the channels available to the access point 11. If there were no channels in common between the possible connection 16A between the computer 12A and the docking station 13A and the connection 15A between the computer 12A and the access point 11, different channels would have to be used, or the connection 16A between the computer 12A and the docking station 13A might fail.

Assuming that this is not the case, the group is finally formed with the connection 16A on the selected channel at Step S44.

For the second pair of computer 12B and docking station 13B shown in FIG. 1, it is determined at Step S41 that the docking station 13B is connected to the network via Ethernet 14. The process therefore follows the branch on the left of the diagram, beginning at "Yes" and labelled 'Y' in the step numbering.

At Step S4Y1, the docking station 13B transmits a high group owner intent in order to indicate that it should be the group owner, since it has access to the preferable wired network connection 14. This will act as previously described, and in the example shown in FIGS. 2 and 3, the docking station 13B is therefore represented by Peer 2 22. The computer 12B may transmit a standard mid-level group owner intent as previously mentioned, or it may specifically transmit a low group owner intent as it has no network connection currently and therefore if the docking station 13B has access to a network connection the computer 12B should not be selected as group owner. In the example shown in FIGS. 2 and 3, it is represented by Peer 1 21.

In accordance with the group owner intents transmitted, the docking station 13B then becomes the group owner at Step S4Y2.

The exchanges of group owner intents 31 and 34 and channel lists 32 and 35 may be simultaneous as previously described and suggested by FIGS. 3 and 4, or it may be consecutive. An embodiment in which the exchanges are consecutive is described in this example. The channel lists will be exchanged regardless of whether the docking station 13B is connected to the wired Ethernet connection 14, and therefore it is still represented by its own branch.

Having determined the docking station 13B is the group owner at Step S4Y1, the peers 21 and 22 then exchange lists of the channels each supports in various configurations at Step S42 as previously described. It may in practice be preferable, since the group owner has been determined, for that device to only transmit the list of channels it supports as group owner, since the channels it supports as a client are irrelevant. Likewise, the other device may only transmit the list of channels it supports as a client.

Although the channel lists are transmitted after the group owner is determined and may not be transmitted in conjunction with one another, this method remains distinct from the current art due to its symmetry and because no lists are transmitted at all until the group owner has been determined.

At Step S43, the peers 21 and 22 select the channel on which the connection 23 should take place, first determining the common channels between the list 35 of channels supported by the docking station 13B as group owner and the list 33 of channels supported by the computer 12B as client. Since the docking station 13B is represented by Peer 2 22 and the computer 12B by Peer 1 21, the same channels are available as determined in the previous example: Channel 1, Channel 3, and DFS A. One of these must therefore be used for the connection 23.

Since the computer 12B is not connected to the access point 11, this is not a factor and other heuristics may be used. For example, the peers 21 and 22 may select the channel which currently has least traffic on it: in an office environment, some channels may be very congested if, for example, they are the channels favoured by the access point 11. In the previous example, the computer 12B was connected to the access point 11 on Channel 1 and this channel could therefore be avoided as it is likely to be slow and prone to interference. Likewise, DFS channels are currently not much used as a limited number of devices are capable of using them, and the peers 21 and 22 might therefore be arranged to preferentially connect on a DFS channel if possible. Similarly, they may be configured to prefer any other channels, or to select a channel used by another connected device such as a wireless peripheral.

Finally, the peers 21 and 22 might simply step through the available channels in an order such as the order they are provided in the respective channel lists until they find one on which a connection is successful.

In any case, the group is finally formed with the connection 23 and 16B on the selected channel at Step S44.

The final example is the third pair of computer 12C and docking station 13C. In this example, at Step S41 it is determined that the docking station 13C does have a wired connection 17C to Ethernet 14, and so the left-hand branch labelled 'Y' is used as previously described.

At Step S4Y1, the docking station 13C transmits a group owner intent. In this example, the computer 12C and docking station 13C are configured to use integers between 1 and 10 as previously mentioned, but to interpret low numbers as preferential such that a peer that transmits 4 as its group owner intent is preferred over a peer that transmits 6 as its group owner intent. This means that at Step S4Y1 the docking station 13C transmits a low number.

The computer 12C, meanwhile, may transmit a standard mid-level group owner intent, or it may also transmit a low number, since it is connected 15C to the access point 11 and therefore it would be preferable for it to be able to select the channel used for the connection 16C so that it could select the channel already in use for its connection 15C to the access point 11 as previously described; it is unlikely to be aware of the connections available to the docking station 13C at this point, though the docking station 13C could, for example, transmit a flag indicating that it has an Ethernet connection 17C along with its group owner intent. Alternatively, the computer 12C could be configured to never give a 'higher' group owner intent than '2', so there is always scope for a docking station 13C to give '1' as its group owner intent and thereby be more preferred.

In any case, the docking station 13C gives a preferential group owner intent and therefore becomes group owner at Step S4Y2. For the sake of this example, the information elements shown in FIG. 3 will be used once more, and the docking station 13C therefore corresponds to Peer 1 21, which has transmitted the group owner intent '3' 31. The computer 12C corresponds to Peer 2 22, which has transmitted the mid-level group owner intent '6' 34.

Simultaneously with their group owner intents 31 and 34, the peers 21 and 22 have transmitted their respective channel lists at Step S42. In this example, the peers 21 and 22 transmit their lists of channels supported as group owner 32 and 35 separately first (perhaps in the same message as their respective group owner intents). For the docking station 13C and 21, this list comprises Channel 1, Channel 2, and Channel 3. They then transmit their respective lists of channels supported as client 33 and 36. In practice, this is likely to be done shortly before Step S4Y2 in which the group owner is selected. For the computer 12C, the channels supported as client are Channel 1, Channel 2, Channel 3, Channel 4, DFS A, DFS B, and DFS C.

At Step S43, the channel to be used for the connection 23 is determined. First, as previously mentioned, the peers 21, 22 select the channels that are common between the computer's 12C list of channels supported as client 36 and the docking station's 13C list of channels supported as group owner 32. These are Channel 1, Channel 2, and Channel 3. Heuristics may then be used to select between them.

In this case, the computer's 12C existing connection 15C to the access point 11 may be borne in mind, but it should not be the determining factor as not only should the computer 12C use the docking station's 13C Ethernet connection 17C to access the network, but this channel is likely to be crowded due to the presence of computers and computer-docking station pairs such as the first example 12A, 13A, which must use the channels available to the access point 11. In fact, it may be beneficial to purposefully not use the channel used for the computer's 12C connection 15C to the access point 11.

In any case, the channel is selected and the peers form a group. In this example, as part of the formation of the group the computer 12C should disconnect from the access point 11 and instead use the Ethernet connection 14 to access the network. This will reduce load on the wireless access point 11 and therefore congestion in the wireless network, as well as encouraging the computer 12C to use the Ethernet connection 17C, which is likely to be more reliable and have a larger capacity.

Figure 5:
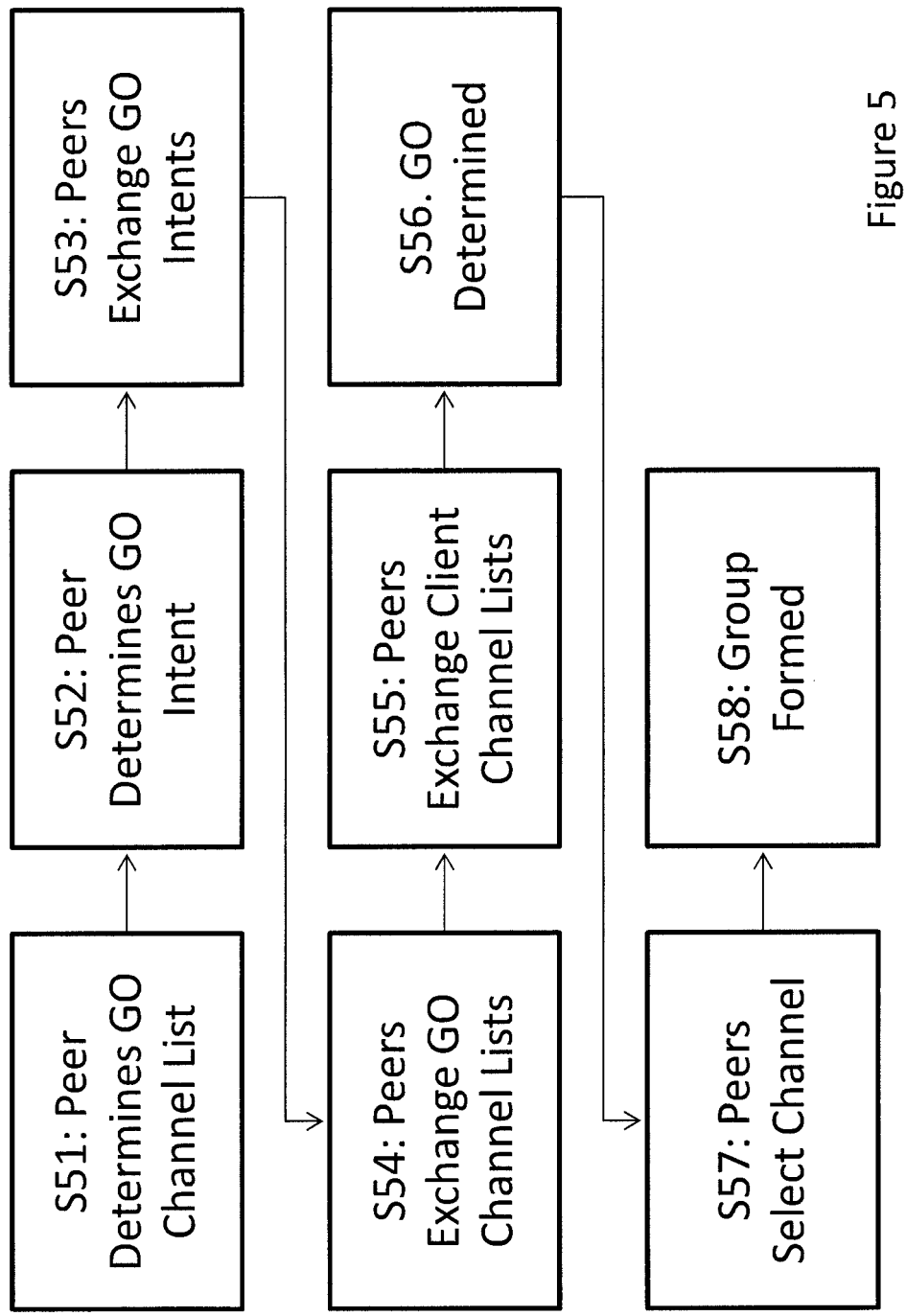
FIG. 5 shows a flowchart of an alternative embodiment of the process.

In these examples, the group owner intents transmitted by the peers 21 and 22 have been determined by whether the docking station 13 is connected 17 to Ethernet 14. An alternative method of determining group owner intent is shown in FIG. 5, which also demonstrates an entirely serial, though still symmetrical, method as opposed to the parallel method shown in FIG. 4.

At Step S51, a peer determines the list of channels it supports as group owner. Using Peer 1 21 of FIGS. 2 and 3 as an example, this list 32 consists of three channels: Channel 1, Channel 2, and Channel 3. The peer 21 then uses this list 32 to determine its group owner intent 31 at Step S52. It might, for example, simply transmit the number of channels it supports as group owner 32 as its group owner intent 31, either subject to a cap or not. This could allow the group owner to be selected based on the number of channels supported in order to maximise the choice of channels that could be used by the eventual connection 23. The group owner intent 31 is transmitted to the other peer 22 at Step S53, and the current peer 21 will likewise receive the other peer's 22 group owner intent 34.

At Step S54, the peers 21, 22 exchange lists of the channels each supports as group owner 32 and 35, as previously described. At Step S55, they exchange lists of the channels they each support as clients 33 and 36, also as previously described. In this embodiment, the whole process is serial, and the group owner is not determined until Step S56. There is therefore no question of only transmitting partial lists, though the lists could be transmitted as a single step either as two separate lists as shown in FIG. 3a or a combined list as shown in FIG. 3b.

This placement of the step of determining the group owner means that if the two peers 21 and 22 transmit identical group owner intents 31 and 34—for example, because they both support the same number of channels as group owners—other factors can be used to break ties. For example, if at this stage the group owner intents 31 and 34 are the same, the number of channels each peer supports as client 33 and 36 could be determined and the peer that supports the smaller number could be selected as group owner in order to maximise the channels available for the connection. Alternatively, the lists 32, 33, 35 and 36 could be compared to determine the number of channels that would in fact be available in each configuration and the group owner selected to maximise this number.

Naturally, the number of channels a peer 21 and 22 supports as client could also be used to determine the original group owner intent 31 and 34, such that, for example, if a peer supports a large number of channels as a client, it transmits a non-preferred group owner intent in order to maximise the number of channels potentially available. Alternatively, each peer could compare the list of channels it supports as group owner with the list of channels it supports as client in order to use the discrepancy to determine the group owner intent, such that, for example, if the peer has a much larger list of channels supported as client than group owner, that peer transmits a non-preferred group owner intent.

In the initial example in which the group owner intent is the number of channels supported as group owner, Peer 1 21 will transmit the group owner intent 31 '3' and Peer 2 22 will transmit the group owner intent 34 '4'. In this embodiment, Peer 2 22 will be selected as the group owner, as it has the higher group owner intent 31 and 34.

In any case, having determined the group owner at Step S56, the peers 21 and 22 select the channel to be used for the connection 23 at Step S57. This is likely to follow a similar process to that already described, consisting of first determining the common channels between Peer 2's 22 list of channels supported as group owner 35 and Peer 1's 21 list of channels supported as client 33 and then using heuristics to determine the channel to be used. However, other processes may be used.

For example, each peer 21 and 22 may be configured to order its list of channels supported as group owner 32 and 35 in order of preference, such that, to use the example shown in FIG. 3, when Peer 2 22 is a group owner it prefers to connect on Channel 1, but if that is not possible it will attempt to connect on Channel 3 and so forth. A similar method could be used for the lists of channels supported as clients 33 and 36. If such a sorting method is used, the group owner 22 could step down its list of channels supported as group owner 35 and check if each one is present on the client's 21 list of channels supported as client 33, and if it finds that it is, it does not look further but attempts to connect on that channel. In this example, Channel 1 would therefore be selected. However, this is not a preferred method as it is likely to lead to increased congestion; it is more beneficial to take account of external circumstances such as existing channel congestion and the channels used by other devices located nearby.

At Step S58, the connection 23 is completed and the group formed. As previously mentioned, this may require one peer 21 and 22 to break an existing connection with an access point, and it may also include forming connections with other devices such as peripherals.

Figure 6:
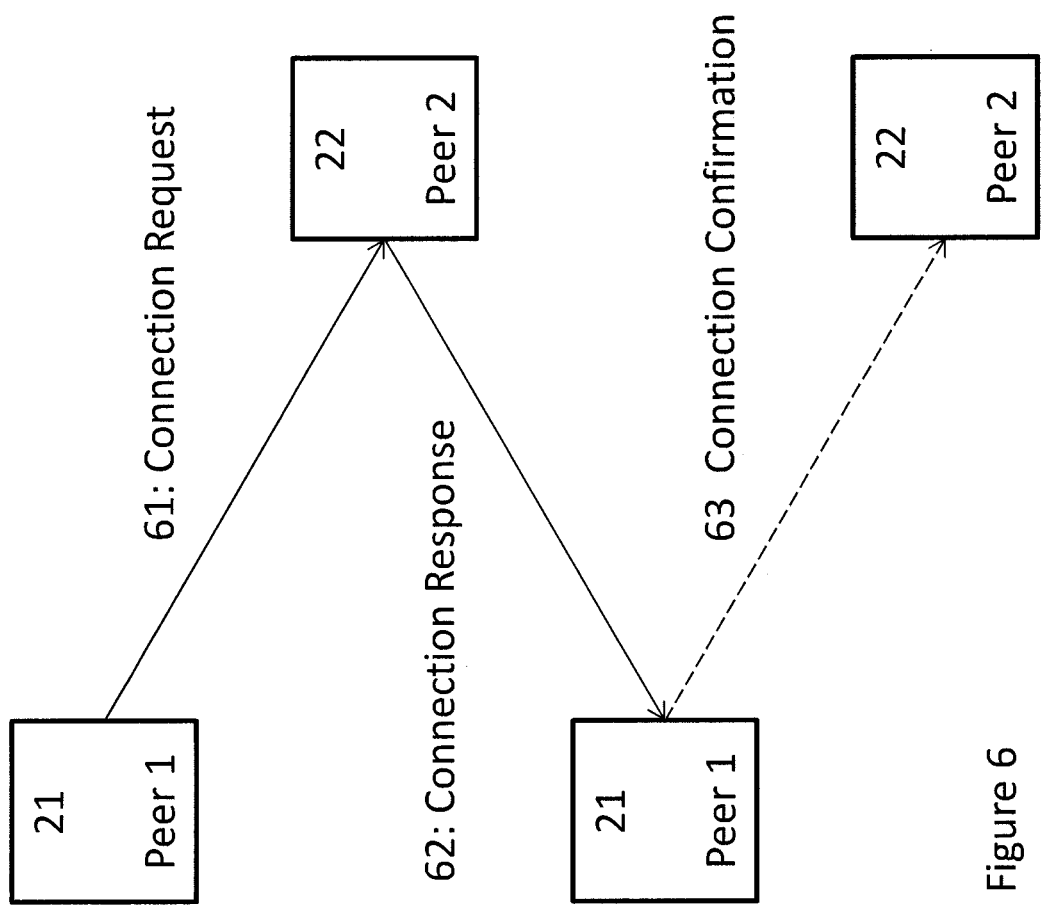
FIG. 6 shows an example of messages exchanged in an asymmetric connection process.

FIG. 6 shows an example of messages exchanged between the peers in an embodiment in which the initiation of the connection is asymmetrical, using the devices Peer 1 21 and Peer 2 22 shown in FIG. 2.

First, Peer 1 21 transmits a Connection Request 61 to Peer 2 22, which returns a Connection Response 62 to Peer 1 21. Peer 1 21 may optionally then send a Connection Confirmation 63 to Peer 2 22. These messages may contain various information including identifications of the peers 21 and 22 and group owner intents and channel lists such as those previously described; in this example, the Group Owner intents and channel lists shown in FIG. 3 will be used.

In a first embodiment, the Connection Request 61 consists solely of Peer 1's 21 Group Owner Intent 31 and no channel lists are sent at this time, unlike in the current art as previously described. Since Peer 2 22 already has its own Group Owner Intent 34, it is now able to determine which device 21 and 22 will become group owner. In the example shown in FIG. 3, Peer 2 22 has supplied a higher group owner intent 34 and will become the group owner. It transmits a notification of this fact to Peer 1 in the Connection Response 62, possibly in the form of its Group Owner Intent 34. This notification may be accompanied by the list of channels Peer 2 22 supports as group owner 35 and possibly also by the list of channels it supports as a client 36, though this list is not in fact relevant. Similarly, if Peer 2 22 were the client it might transmit only its list of channels supported as client 36 in the Connection Response 62. Alternatively, if it is group owner, it might only transmit the notification of that fact, since Peer 1 21 would not need to be aware of the channels supported by Peer 2 22.

Peer 1 21 is thereby aware or able to determine that it is the client, and so it transmits its list of channels supported as client 33 to Peer 2 22 in the Connection Confirmation 43. Alternatively, it may compare the received list of channels Peer 2 supports as group owner 35 with the list of channels it supports as a client 33 and only transmit a list of the channels that could in fact be used for a connection, as previously mentioned.

Naturally, if Peer 1 21 were in fact the group owner, no transmission of further channel lists would be required as it is aware of the channels available to it as group owner 32 and has received the channels supported by Peer 2 as a client 36 in the Connection Response 62. It can therefore determine the channel to be used and finalise the connection. For this reason, the Connection Confirmation 63 may not always be sent, or may be sent as a null operation.

In a second embodiment, Peer 1 21 transmits a Connection Request 61 comprising its Group Owner Intent 31, the list of channels it supports as group owner 32, and the list of channels it supports as client 33. Peer 2 22 is then able to determine whether it is the client or the group owner, since it now has access to both Group Owner Intents 31, 34. If it is the group owner, it compares the received list of channels supported by Peer 1 as a client 33 with its own list of channels supported as a group owner 35, and likewise if it is the client it compares its own list of channels supported as a client 36 with the received list of channels supported by Peer 1 as a group owner 32.

If Peer 2 22 is a client, it transmits the list of channels it supports as a client to Peer 1 21 in the Connection Response 62, enabling Peer 1 21 as group owner to finalise the connection without any further messages, meaning that only two messages are required in total for negotiation. In a lazy but symmetrical embodiment that may be useful if the group owner may change and the connection need to be re-negotiated, Peer 2 22 may also transmit the list of channels it supports as a group owner 35. Alternatively, having compared the list of channels supported by Peer 1 as a group owner 32 with the list of channels Peer 2 supports as a client 36, Peer 2 22 may transmit a list of channels that could in fact be used for a connection.

Whichever device is the group owner will then finalise the connection. In this embodiment, the Connection Confirmation 63 will not be required Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules. Furthermore, software instructions to implement the described methods may be provided on a computer readable medium.

What is claimed is:

1. A method for facilitating peer-to-peer connection, the method comprising:
    transmitting, by a first peer device to a second peer device, an identification of the first peer device, a value of intent of the first peer device to be a group owner, and information regarding capabilities of the first peer device including a list of transmission channels providing an indication of which transmission channels the first peer device is capable of supporting as a group owner and which transmission channels the first peer device is capable of supporting as a client;
    receiving, by the first peer device from the second peer device, an identification of the second peer device, a value of intent of the second peer device to be a group owner, and information regarding capabilities of the second peer device including a list of transmission channels providing an indication of which transmission channels the second peer device is capable of supporting as a group owner and as a client but not necessarily as a group owner;
    determining which of the first and second peer devices is to be the group owner and which is to be the client, based on the values of intent of the first and second peer devices to be the group owner, and which of the transmission channels is to be used for communicating between the group owner and the client based on the indication of which of the transmission channels the first and second peer devices are capable of supporting as a group owner and on the indication of which of the transmission channels the first and second peer devices are capable of supporting as a client but not necessarily as a group owner; and
    forming the peer-to-peer connection over the determined transmission channel.

2. The method according to claim 1, wherein the first peer device first transmits a list providing the indication of which transmission channels the first peer device is capable of supporting as a group owner and then transmits a list providing the indication of which transmission channels the first peer device is capable of supporting as a client but not necessarily as a group owner after it has received a list from the second peer device providing the indication of which transmission channels the second peer device is capable of supporting as a group owner.

3. The method according to claim 1, wherein the first peer device first transmits a list providing the indication of which transmission channels the first peer device is capable of supporting as a group owner and receives the list from the second peer device providing the indication of which transmission channels the second peer device is capable of supporting as a group owner, the first peer device then determining which channels it is capable of supporting as a client that match channels that the second peer device is capable of supporting as a group owner and transmitting a list providing the indication of which transmission channels the first peer device is capable of supporting as a client that only includes the matching channels.

4. The method according to claim 1, the method further comprising:
    if the first peer device is determined to be the group owner, performing, by the first peer device, the determination of which of the transmission channels is to be used for communicating between the first peer device and the second peer device.

5. The method according to claim 1, wherein the determination of which of the first and second peer devices should be the group owner and which should be the client comprises:
    determining that the peer device whose value of intent to be a group owner is higher is the group owner and that the peer device whose value of intent to be a group owner is lower is the client.

6. The method according to claim 5, further comprising adjusting, by the first peer device, a value of an intent of the first peer device to be a group owner based on enabled or disabled capabilities of the first peer device.

7. The method according to claim 6, wherein the value of the intent of the first peer device to be a group owner is increased when the first peer device is connected to the internet and is capable of allowing access to the internet to connected peer devices and is decreased when the first peer device is not connected to the internet and is not capable of allowing access to the internet to connected peer devices.

8. The method according to claim 1, wherein the list received from the second peer device includes a list of transmission channels the second peer device is capable of supporting as a group owner, and a list of transmission channels the second peer device is capable of supporting as a client but not necessarily as a group owner.

9. The method according to claim 1, wherein the list received from the second peer device includes a list of transmission channels the second peer device is capable of supporting as a client, together with an indication of which of the transmission channels the second peer device is also capable of supporting as a group owner.

10. The method according to claim 1, wherein the list transmitted by the first peer device includes a list of transmission channels the first peer device is capable of supporting as a group owner, and a list of transmission channels the first peer device is capable of supporting as a client but not necessarily as a group owner.

11. The method according to claim 1, wherein the list transmitted by the first peer device includes a list of transmission channels the first peer device is capable of supporting as a client, together with an indication of which of the transmission channels the first peer device is also capable of supporting as a group owner.

12. The method according to claim 1, wherein the transmission channels that the first peer device is capable of supporting as a client includes the transmission channels the first peer device is capable of supporting as a group owner.

13. The method according to claim 1, wherein the transmission channels that the first peer device is capable of supporting as a client includes transmission channels that the first peer device is not capable of supporting as a group owner.

14. The method according to claim 13, wherein the transmission channels that the first peer device is capable of supporting as a client but not as a group owner comprise Dynamic Frequency Selection, DFS, transmission channels.

15. A first peer device configured to perform all the steps of a method performed by the first peer device according to claim 1.

16. A system comprising a first peer device according to claim 15 and a second peer device in communication with the first peer device.

17. A method for facilitating peer-to-peer connection, the method comprising:
  transmitting, by a first peer device to a second peer device, an identification of the first peer device and a value of intent of the first peer device to be a group owner, optionally together with information regarding capabilities of the first peer device including at least one list of transmission channels providing an indication of which of the transmission channels the first peer device is capable of supporting as at least a client but not necessarily as a group owner;
  receiving, by the first peer device from the second peer device, an identification of the second peer device and information indicating that the second peer device is to be either a group owner or a client based on a comparison, by the second peer device, of a value of intent of the second peer device to be a group owner with the value of intent of the first peer device to be a group owner;
  if the first peer device receives information that the second peer device is to be the group owner:
    sending, by the first peer device, information regarding capabilities of the first peer device including at least one list of transmission channels providing an indication of which of the transmission channels the first peer device is capable of supporting as a client but not necessarily as a group owner, if it has not already sent the indication of which of the transmission channels the first peer device is capable of supporting as a client but not necessarily as a group owner to the second peer device; and
    receiving, by the first peer device from the second peer device, information indicating which transmission channel is selected to be used for communicating between the group owner and the client;
  if the first peer device receives information that the second peer device is to be the client, the first peer device receives information regarding capabilities of the second peer device including at least one list of transmission channels providing an indication of which of the transmission channels the second peer device is capable of supporting as a client but not necessarily as a group owner, either with the information that the second peer device is to be the client, or separately therefrom, the first peer device then:
    determining which of the transmission channels is selected to be used for communicating between the group owner and the client based on the indication of the transmission channels the second peer device is capable of supporting as a client but not necessarily as a group owner; and
    transmitting to the second peer device information indicating which transmission channel is to be used for communicating between the group owner and the client; and
  forming the peer-to-peer connection over the selected transmission channel.

18. A first peer device configured to perform all the steps of a method performed by the first peer device according to claim 17.

* * * * *